Oct. 23, 1956  J. W. ARNOLD  2,767,925
SAFETY DEVICE FOR LIQUID HEATERS
Filed March 4, 1955
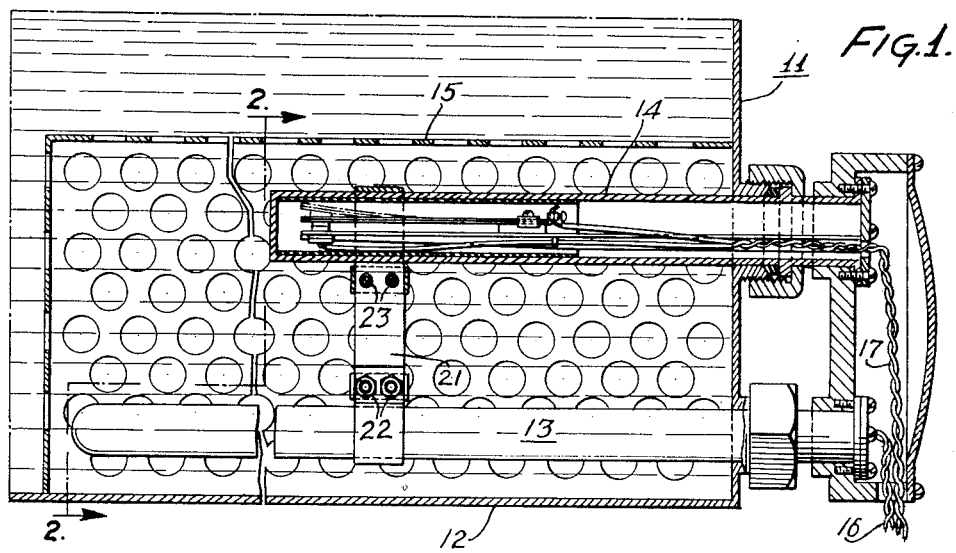
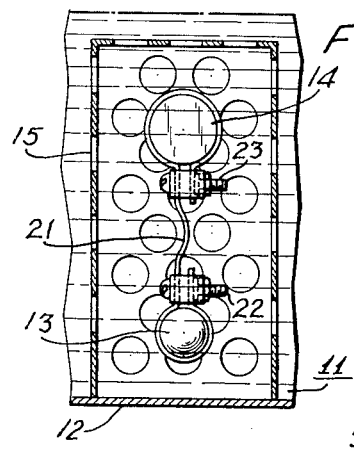
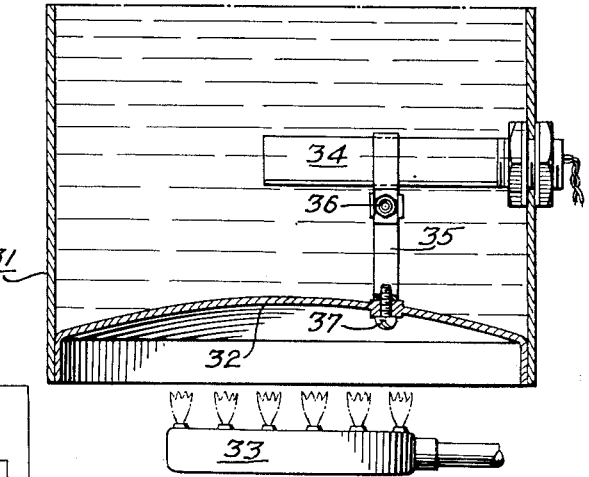
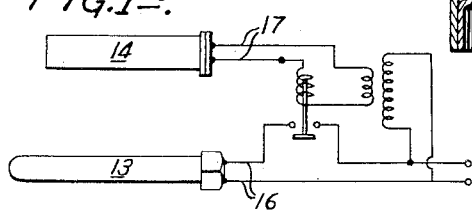
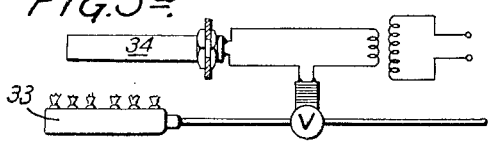
Inventor:
Joseph W. Arnold
by Howson & Howson
Attys.

United States Patent Office 2,767,925
Patented Oct. 23, 1956

2,767,925
SAFETY DEVICE FOR LIQUID HEATERS

Joseph W. Arnold, West Cape May, N. J.

Application March 4, 1955, Serial No. 492,094

3 Claims. (Cl. 236—20)

The present invention relates to a safety device for liquid heaters, and has particular application to heaters in which the liquid is maintained just below the boiling point, but is subject to evaporation.

In conventional liquid heaters for dish washers and like apparatus, there is no provision for automatically shutting down the heating unit when the liquid level falls below a safe level. As a result, the heating unit continues to operate, and when the liquid has evaporated, the unit is continuously energized since the heat of the unit does not actuate the thermostat to shut off the power to the unit. To be sure, in boilers and like heavy duty installations, safety devices have been provided which involve floats responsive to the water level, or complicated circuits involving a second heat source, or a second thermostat. However, such devices are too expensive for installation in liquid heaters of the type described.

The present invention provides a simple, yet effective means for automatically coupling the thermostat directly to the heater when the water level of the liquid bath falls below a safe level.

The device of the present invention is of extremely simple manufacture, and is readily assembled and put into operation.

These and other objects and the various features and details of the construction and operation thereof are more fully set forth hereinafter with reference to the accompanying drawing in which:

Fig. 1 is a fragmentary sectional view of a liquid heater embodying a safety device made in accordance with the present invention;

Fig. 1a is a schematic showing of the electrical connections of Fig. 1;

Fig. 2 is a sectional view on line 2—2 of Fig. 1;

Fig. 3 is a modification within the scope of the present invention showing the safety device applied to a gas-fired liquid heater; and Fig. 3a is a schematic showing of the electrical connections of Fig. 3.

Referring to the drawing and more particularly to Figs. 1 and 2 thereof, the liquid heater embodying a safety device made in accordance with the present invention comprises a tank 11 for containing the liquid, having mounted adjacent the bottom 12 thereof an electric heating element 13. Positioned adjacent the heating element 13, but sufficiently removed to be isolated from the radiant heat thereof, is a conventional thermostat unit 14. The heating unit 13 and the thermostat 14 are encased in a foraminous guard 15 which protects these elements from damage by materials placed in the liquid bath.

The heating element 13 is energized electrically by a power line indicated at 16 to maintain the liquid at a desired temperature. To this end, the power supplied by the line is regulated in accordance with a control provided by the leads 17 of the thermostat, the thermostat being set to maintain the liquid bath at a temperature below the boiling point of the liquid. Because of the elevated temperature, after prolonged periods of use, the liquid evaporates and the liquid level in the tank 11 falls. In normal operation, the attendant replenishes the liquid when the level falls below a predetermined minimum, but frequently replenishment is neglected, or the unit is not disconnected from the power supply when the operations cease and the attendant leaves. In this event, the liquid gradually evaporates and falls below the level of the thermostat, thereby isolating the heating element 13 from the control of the thermostat.

In accordance with the present invention, means is provided to operatively connect the heating unit with the thermostat when the liquid level falls below a safe level. To this end, a thin conductive strap 21 is connected at one end to the heating element 13, and at the other end to the thermostat 14. The strap is thin, the cross sectional area being less than the surface area, so that when the water level is above the thermostat and the strap is completely immersed in the liquid, the major portion of the heat in the strap is conducted into the liquid surrounding it, and the strap is maintained at the temperature of the surrounding liquid. However, when the liquid level falls below the level of the strap, there is no direct contact between the strap and the liquid, and any heat loss from the strap must be by radiation. As is well known, radiation losses of heat are substantially less than conductive losses of heat, and accordingly, the temperature of the strap is maintained at the temperature level of the heating element 13. The temperature of the strap controls the thermostat 14, so that when there is no liquid in the container 11, the operation of the heating element immediately operates to actuate the thermostat which in turn modulates the supply of energy to the heating element. Thus, the temperature of the heating element is not permitted to become higher than the setting of the thermostat, and damage to the equipment by over-heating is effectively prevented. As shown, the strap is connected to the heating unit 13 and the thermostat 14 by bolted connections indicated at 22 and 23 respectively, but it should be understood that any suitable connection may be made.

Thus, the present invention provides a link between the main heating element of the liquid heater and the operating thermostat thereof to operatively connect the same when the water level in the liquid bath falls below a predetermined safe value. When the liquid level is at a safe value, the connection is ineffective to directly control the operation of the thermostat by the heating unit, the conrol of the thermostat being accomplished primarily by the liquid temperature of the liquid bath.

The present invention is not confined to electrically energized heaters, but is also applicable to gas-fired heaters. A suitable arrangement for heaters which are energized by gas is shown in Fig. 3. In this embodiment of the invention, the liquid is contained in a tank 31 having a bottom portion 32 which is directly heated by a gas burner 33. The heat from the bottom 32 serves as the primary heat source for the liquid heater. Positioned adjacent the heat source 32, but sufficiently removed to be isolated from the rate of heat thereof, is a thermostat unit 34. The thermostat is responsive to the temperature of the liquid bath to modulate the supply of gas to the burner 33 to maintain the liquid bath below the boiling point thereof.

In accordance with the invention, means is provided to operatively connect the thermostat 34 with the heat source 32 when the liquid level in the bath falls below the thermostat unit 34. To this end, a thin conductive strap 35 is connected at one end to the thermostat 34 as indicated at 36 and at the other end to the heat source 32 as indicated at 37. As shown, the connections 36 and 37 are bolts, but it is possible to employ other connections without departing from the invention.

As in the previously described embodiment, the strap is a relatively thin conductive member, so that when it is immersed in the liquid, the heat from the heat source 32 is conducted into the liquid bath to maintain the strap at the bath temperature, and the thermostat is therefore controlled primarily by the temperature of the liquid bath. When the liquid level falls, exposing the strap 35 to air, the heat in the strap is not radiated sufficiently and the strap assumes the temperature of the heating unit. The thermostat is therefore directly coupled to the heat source 32, and the supply of heat to the source is regulated to maintain its temperature at a safe value.

While particular embodiments of the present invention have been herein illustrated and described, it is not intended to limit the invention to such disclosure, but changes and modifications may be made therein and thereto within the scope of the following claims.

I claim:

1. For a liquid heater having a tank for containing the liquid to be heated, a heat source at the bottom of said tank for heating the liquid, and a thermostat in said tank operable to regulate the supply of heat to said heat source and thereby maintain the temperature of the liquid at a predetermined level, a safety device comprising an elongated thin conductive element connected at one end to said heat source and the other end to said thermostat, said thermostat being responsive to the temperature of said other end of the element, the cross sectional area of said conductive element being less than the surface area thereof so that when the liquid level in said tank is above the conductive element, said element is maintained at the temperature of the liquid bath, and when the liquid level is below the element, said element is maintained at the temperature of said heat source thereby maintaining the heat source at said predetermined temperature level when the liquid level falls below the level of the thermostat.

2. A safety device according to claim 1 wherein said heat source for the liquid bath is an electrically energized heating unit immersed in the bottom of said bath, and wherein further said thermostat operates to regulate the electrical energy supplied to said heating unit.

3. A device according to claim 1 wherein said heat source comprises the bottom of said tank and includes a fuel burner positioned adjacent said tank bottom to heat the same, and wherein further said thermostat operates to regulate the supply of fuel to said burner.

References Cited in the file of this patent

UNITED STATES PATENTS

| | | |
|---|---|---|
| 1,732,100 | Mancib | Oct. 15, 1929 |
| 2,286,929 | Pond | June 16, 1942 |